United States Patent [19]
Baumann

[11] Patent Number: 5,603,829
[45] Date of Patent: Feb. 18, 1997

[54] DEVICE FOR CENTRIFUGALLY AND MECHANICALLY SEPARATING PARTICULATE CONTAMINANTS FROM LUBE OIL

[75] Inventor: Dieter Baumann, Greven, Germany

[73] Assignee: Ing. Walter Hengst GmbH & Co. KG, Muenster, Germany

[21] Appl. No.: 205,261

[22] Filed: Mar. 2, 1994

(Under 37 CFR 1.47)

[30] Foreign Application Priority Data

Mar. 2, 1993 [DE] Germany .................. 43 06 431.0

[51] Int. Cl.$^6$ .................................................. B01D 36/00
[52] U.S. Cl. .......................... 210/275; 210/307; 210/309; 210/438; 210/440; 210/453; 210/512.1; 210/248; 210/454
[58] Field of Search .................................. 210/168, 295, 210/304, 307, 308, 309, 512.1, 438, 440, 453, 248, 454; 494/24, 36; 123/196 A; 184/6.24

[56] References Cited

U.S. PATENT DOCUMENTS 4,615,315  10/1986  Graham ............................ 210/168

FOREIGN PATENT DOCUMENTS 563191   6/1977  U.S.S.R. ............................ 494/36
1255720  9/1986  U.S.S.R. ............................ 184/6.24

*Primary Examiner*—Matthew O. Savage
*Attorney, Agent, or Firm*—Hill, Steadman & Simpson

[57] ABSTRACT

A device for separating contaminants out of the lube oil of an internal combustion engine is provided which includes a filter element, a centrifuge rotatable by means of the lube oil flowing through it, and at least one supply passage for lube oil to be cleaned and at least one drain passage for the cleaned oil. The filter element and the centrifuge are arranged in a common, closable housing with at least one of the filter element and the centrifuge being removable from the housing when the housing is open. The filter element and the centrifuge are arranged in the housing in vertical alignment and a single cover covers the common housing.

13 Claims, 4 Drawing Sheets

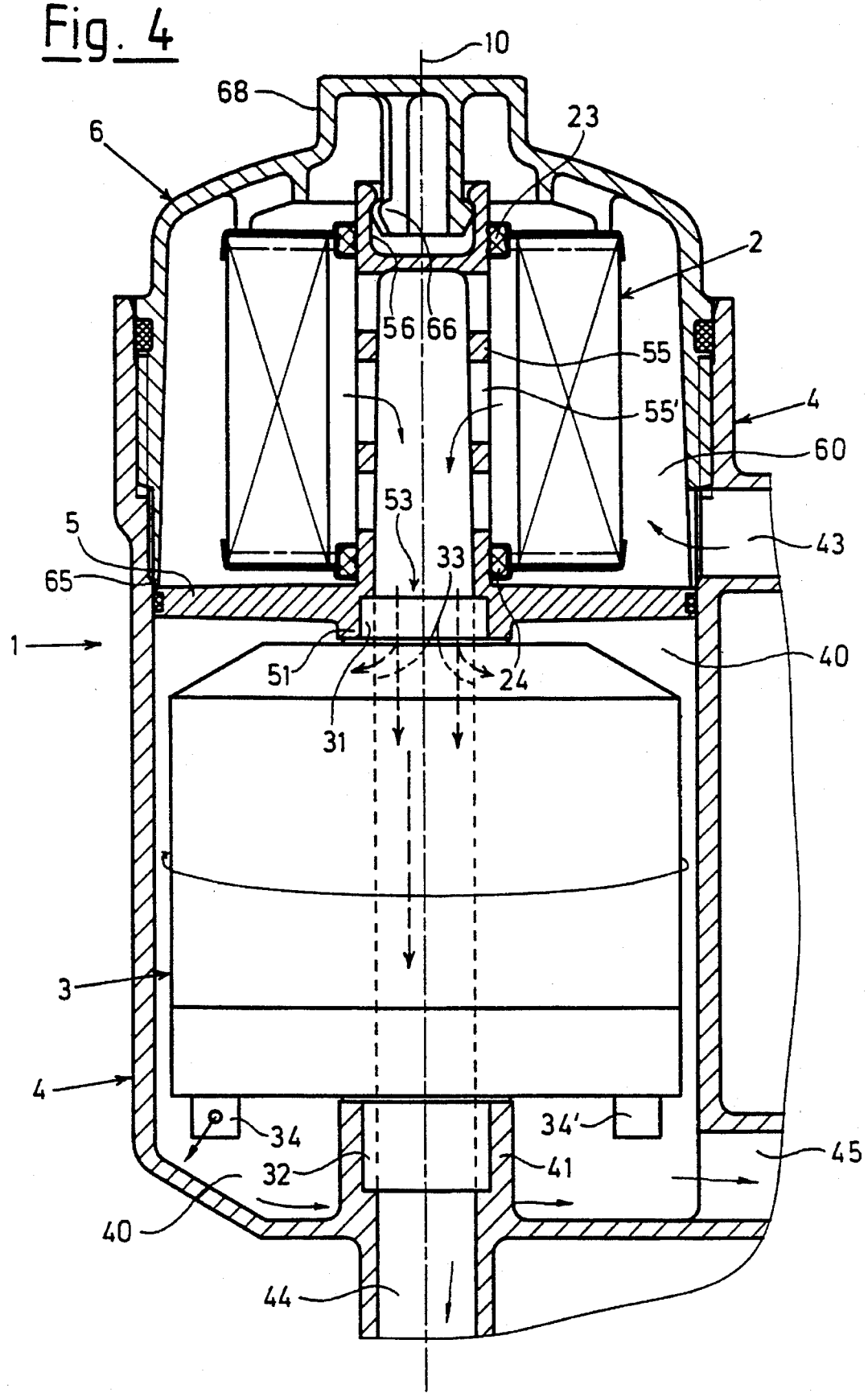

DEVICE FOR CENTRIFUGALLY AND MECHANICALLY SEPARATING PARTICULATE CONTAMINANTS FROM LUBE OIL

BACKGROUND OF THE INVENTION

The invention relates to a device for separating contaminants out of the lube oil of an internal combustion engine with the device comprising a filter element, a centrifuge rotatable by means of the lube oil flowing through, and at least one supply passage for lube oil to be cleaned and at least one drain passage for the cleaned lube oil, with the filter element and the centrifuge arranged in a common, closable housing and with at least one of the filter element and the centrifuge removable from the housing when the housing is open.

A device of the kind mentioned is known from GB-PS 876 299. The common housing for the centrifuge and the filter element with this device comprises two separate chambers with the centrifuge arranged in one chamber and the filter element arranged in the other chamber. These chambers are connected with each other by passages. Furthermore the housing comprises two separate closing covers with one closing cover associated with the chamber containing the centrifuge and the other cover covering the chamber wherein the filter cartridge is arranged.

It is a disadvantage of the known device, that the housing requires a relatively large area for assembling, because two separate chambers for the filter cartridge and the centrifuge are provided therein. Furthermore an individual cover is provided for each chamber which causes a high labor and time effort for maintenance work, when the centrifuge and the filter cartridge have to be taken out of the housing.

A further device for the mentioned purpose is known from GB 21 60 796A. With this known device the filter member on the one side and the centrifuge on the other side are each arranged in a dedicated housing with the two housings arranged at a common mounting member. This mounting member comprises the supply and drain passages for the lube oil to be cleaned and the cleaned oil, respectively. In an embodiment of this known device the two housings for the filter member and the centrifuge are arranged opposing each other at two sides of the mounting member and pointing in opposite directions. Therein the housing of the filter member and the housing of the centrifuge are detachably arranged toward the one side and the other side in order to enable the replacement of the filter member and the centrifuge. With a second embodiment of the known device the two housings for the filter member and the centrifuge are arranged side by side at one side of the mounting member and are detachable in the direction of the one side. Also in this case, however, the filter member and the centrifuge each comprise a dedicated housing.

It is a disadvantage with this known state of the art that the manufacturing effort and the space requirement are high, because two separate housings have to be manufactured and arranged. Additionally the regular maintenance operations with a change of the filter member and a change or at least a cleaning of the centrifuge are both labor and time consuming, as two separate housings have to be opened and closed again.

SUMMARY OF THE INVENTION

Therefore it is an object of the invention to provide a device of the kind mentioned wherein the mentioned disadvantages of the state of the art are avoided and wherein particularly a smaller requirement for space is provided and wherein maintenance work may be done simpler and faster.

The object is attained according to the invention with a device of the kind mentioned which provides that the filter element and the centrifuge are arranged in the housing in vertical alignment, and that a single cover covers the common housing.

With this invention a compact arrangement of the parts of the device is attained both in relation to space and function resulting in a smaller space requirement for the device. For the regular maintenance work only a single housing cover has to be opened, in order to take the filter member or the centrifuge or both out of the housing and to replace them or clean them. After the maintenance work, accordingly, only a single cover has to be put in its position, in order to close the device and make it ready for further operation. Thus, both time and labor are saved during the maintenance operation of the device.

Furthermore, it is proposed that a detachable intermediate wall is arranged in the housing between the filter element and the centrifuge, with the intermediate wall comprising means for securing and/or supporting and/or centering the filter element and/or the centrifuge and comprising at least one passage for lube oil. As mentioned, this intermediate wall may comprise several functions wherein the single functions may be attained selectively or in combination as is required in the embodiment of the device.

For further simplifying the required maintenance work, it is proposed that the filter element and the intermediate wall, or the centrifuge and the intermediate wall, form a detachably connected unit removable from the housing as a unit. The selection of the combination of the parts of the unit to be removed in common from the housing is made according to the conditions of the given case, for example, whether the filter member or the centrifuge is arranged in the housing adjacent to the cover. After taking off the cover of the housing, the unit may be taken out of the housing with the unit comprising the filter member and the intermediate wall, or the centrifuge and the intermediate wall, whereby the other parts of the device, i.e. the remaining centrifuge or the remaining filter member are accessible too. Thereafter this further part of the device which is now accessible without any problems may also be removed from the housing.

As an alternative, the filter member and the centrifuge and the intermediate wall may form a detachable connected unit removable from the housing as a unit, whereby the assembling and disassembling work with the maintenance of this device may be further simplified.

Finally, it is proposed in this context that the unit removable out of the housing may additionally comprise the detachable cover of the housing. Hereby it is attained, that only by taking off the cover, the centrifuge, the intermediate wall, and the filter member may be taken out of the housing in one operation. The combination of the separate parts removable from the housing as a unit may be advantageously accomplished by plug-in or snap-in connections which are simple to be manufactured, simple to be detached, and simple to be connected with each other.

According to the form of the housing and the cover of the device, it is advantageously provided that the housing comprises a substantially cylindrical inner chamber, and that the cover is a substantially cup-shaped screw cover. These forms of housing and cover may be manufactured in a material saving operation and avoid clearance volume, whereby a good use of the volume and a weight saving construction may be achieved. The design of the cover as a screw cover simplifies the assembling and disassembling thereof and at the same time provides for a reliable connection between the cover and the housing even under mechanical load occurring in practical operation.

In order to position and secure the intermediate wall with as little effort as possible, it is proposed that the intermediate wall at one side is supported by a step at the inner wall of the housing or at a bottom of the housing, and at the other side is engaged by the mounted cover. The step in the housing therefore provides for a correct positioning of the intermediate wall. The wall is secured in this position by means of the mounted cover, preferably in the embodiment of the cover as a screw cover by the front side of the cover facing the housing.

In an embodiment of the invention, an automatic drain is provided for the device when changing the filter member.

Finally it is provided, that at least the housing, the cover, and the intermediate wall may each be manufactured by injection molding of plastic material and/or light metal. Through such construction a simple cost saving mass production and a weight saving embodiment of the device are possible.

BRIEF DESCRIPTION OF THE DRAWINGS

In the following embodiments of the device are explained referring to a drawing. The figures of the drawing illustrate:

FIG. 4 is the device in the same illustration in a fourth embodiment.

DETAILED DESCRIPTION OF THE PREFERRED EMBODIMENTS

Figure 1:
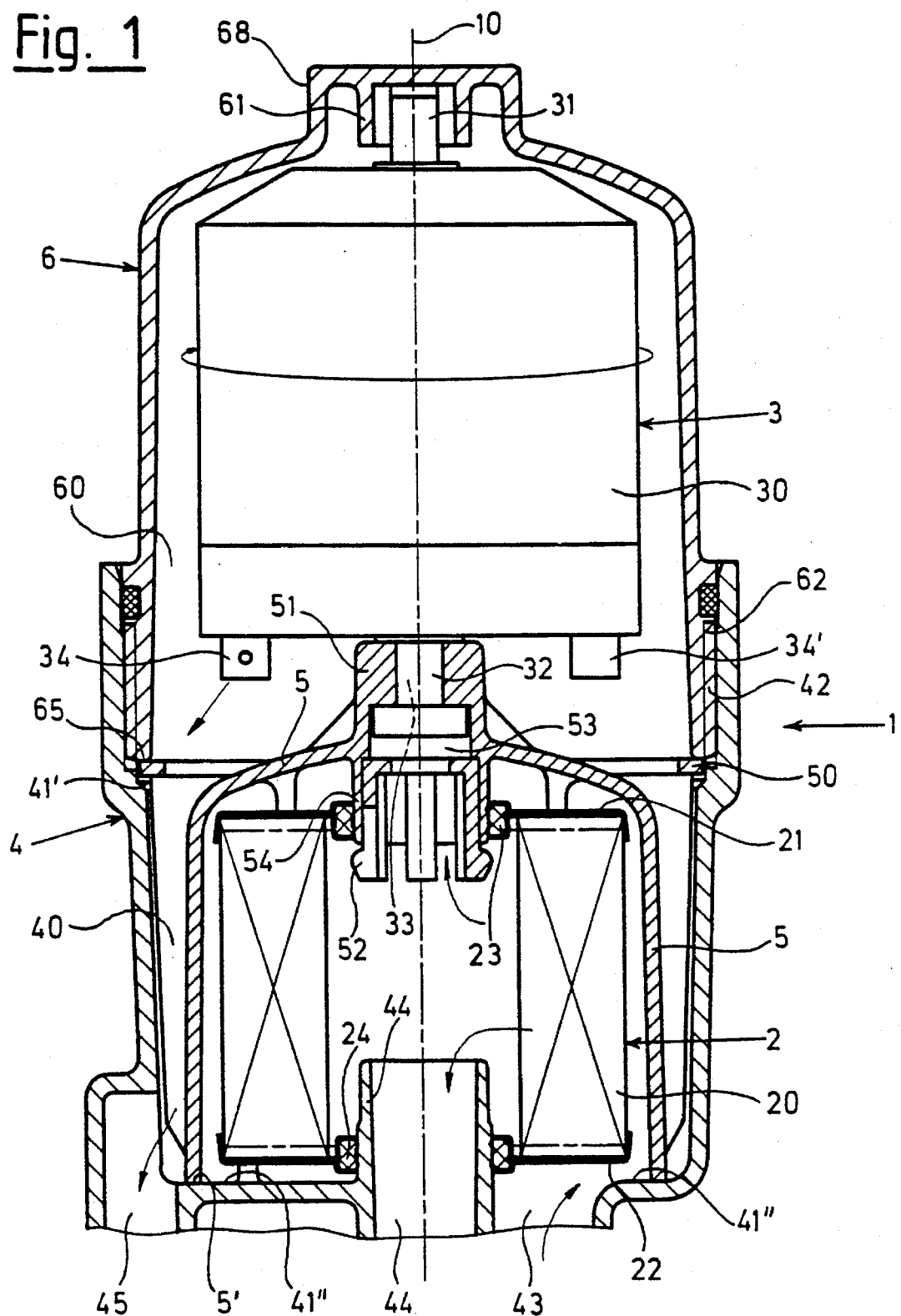
FIG. 1 is a device of a first embodiment in a longitudinal section.

As illustrated in FIG. 1 of the drawing the device 1 according to a first embodiment substantially consists of a filter member 2 and a centrifuge 3 vertically in alignment in a housing 4 which is closed by a cover 6. Within the housing 4 an intermediate wall 5 is arranged between the filter element 2 and the centrifuge 3, the intermediate wall 5 will be described later in detail.

With the embodiment according to FIG. 1 the filter member 2 is arranged in the lower part of the device 1, i.e. in the lower part of the housing 4, and the centrifuge is arranged in the upper part of the housing 4 in the area of the cover 6 closing the housing 4. The filter member 2 and the centrifuge 3 are arranged in vertical alignment and in symmetry with a longitudinal axis 10.

The filter element 2 is designed in a manner known as such and comprises a filter member 20 made of corrugated filter material folded to form a hollow cylindrical body. At each of a top and at a bottom of the filter member 20 a cover disk 21, 22 is arranged and connected thereto, commonly by gluing. Both cover discs 21, 22 comprise a central opening which is surrounded by an elastic sealing ring 23, 24 preferably made of rubber.

Also the centrifuge 3 is a construction member known as such with a centrifuge rotor 30 comprising two oppositely directed jets 34, 34' at the bottom side thereof with the jets spinning the centrifuge rotor 30 of the centrifuge 3 according to the backlash or reaction principle by means of flowing oil. By means of two bearings 31, 32 arranged concentrically in relation to the longitudinal axis 10 the centrifuge rotor 30 is rotatably supported in the device 1. The upper bearing 31 is arranged in the bearing support 61 of the cover 6 and the lower bearing 32 is arranged in a bearing support 51 in the intermediate wall 5.

In the embodiment of FIG. 1, the intermediate wall 5 is bell-shaped or cup-shaped and overlaps the filter member 2 in the total height thereof from the top downwards. The intermediate wall 5 rests with a lower front side 5' thereof at a bottom 41" of the housing 4. Furthermore the intermediate wall 5 comprises in the upper part thereof an outward protruding supporting rim 50 connected with the remaining part of the intermediate wall 5, with the supporting rim resting at a step 41' at the inner side of the housing 4 for positioning and securing the intermediate wall 5. In this position the intermediate wall 5 is secured by a front end 65 of the attached cover with the front end resting from the top at the supporting rim 50. Therein the cover 6 is screwed by means of an outer thread 62 in a correspondingly shaped inner thread 42 of the housing 4 with a seal put in-between. To simplify the detachment of the cover 6, the cover comprises at the upper end 68 thereof a tool engaging surface, e.g. a hexagon.

The filter element 2 is arranged with the lower sealing ring 24 thereof at a pipe piece 44' with a graduated outer thread. At the upper sealing ring 23, the filter element 2 is secured at a connection piece 54 of the intermediate wall 5. Several snap-in lugs 52 protrude downward from this connection piece 54 with the snap-in lugs protruding outwards beyond the outer circumference of the connection piece 54. Furthermore an oil passage 53 extends through the connection piece 54 upwards with the oil passage extending to an oil inlet 33 of the centrifuge 3 at the lower end thereof.

The inlet and outlet of the cleaned or, respectively, to be cleaned lube oil from or, respectively, to the internal combustion engine is attained in this embodiment of the device 1 from the bottom or, respectively, to the bottom. In the right bottom area of the device 1 in the housing 4 an oil supply passage 43 is provided opening into the interior of the bell-shaped intermediate wall 5. The lube oil to be cleaned flows through this supply passage 43 to the outer circumference of the filter element 2 and flows through the filter member 20 from the outer to the inner side thereof. A part of the filtered lube oil directly flows into an oil drain passage 44 with the upper end thereof forming the pipe piece 44'. The filtered oil flows through the drain passage 44 to the lube points of an associated internal combustion engine.

Another part of the lube oil filtered by the filter member 20 streams upwards through the central oil opening 53 in the intermediate wall 5 to the inlet 33 of the centrifuge 3. After having passed through the centrifuge, the lube oil cleaned in the centrifuge flows through the jets 34, 34' into the inner chamber 60 of the cover 6 and from there downwards under gravity into the interior 40 of the housing 4 outside of the bell-shaped intermediate wall 5 and finally into a second oil drain passage 45 which preferably leads into the oil sump of the internal combustion engine.

Furthermore FIG. 1 illustrates that the centrifuge 3, the intermediate wall 5 arranged thereunder and the filter element 2 again arranged thereunder are detachably combined with each other to form a unit to be taken out of the housing 4 after having screwed off the cover 6. After having screwed off the cover 6 the centrifuge 3 or, respectively, the rotor 30 thereof may be gripped and manually taken out together with the intermediate wall 5 and the filter element 2. When taking it out, the lower sealing ring 24 at the lower cover disc 22 of the filter member 20 passes on its way upwards into an area of the pipe piece 44' with a smaller outer diameter and at the same time the front side 5' of the intermediate wall 5 is raised from the bottom 41" of the housing, whereby a drain opening for remaining oil in the area of the filter member 20 is created through the oil drain passage 45 having no pressure into the oil sump of the internal combustion engine.

Figure 2:
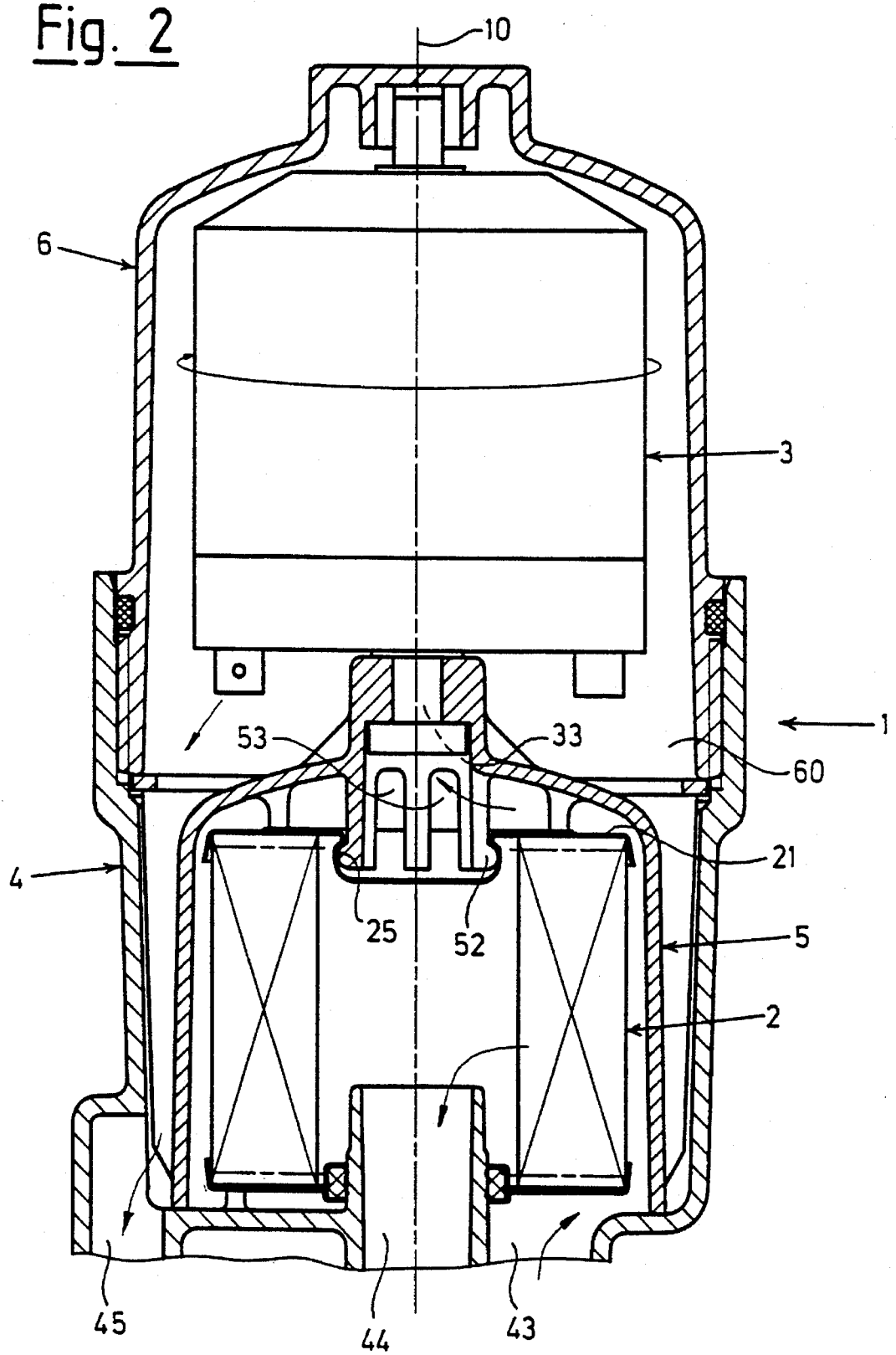
FIG. 2 is the device in the same illustration in a second embodiment.

With a second embodiment of the device 1 illustrated in FIG. 2 also the centrifuge 3 and the filter element 2 are arranged in vertical alignment in the housing 4 and in the cover 6, however, differences are present in relation to the embodiment of the filter element 2 and the kind of the passages for the lube oil. Different from the embodiment illustrated in FIG. 1 the filter element 2 in this case is designed with a closed upper cover disc 21 having no opening. However, at the upper side thereof the cover disc 21 comprises an undercut circumferential snap-in recess 25 with several, in this example four snap-in lugs 52 engaging into the snap-in recess, with the snap-in lugs 52 extending from the top and from the intermediate wall 5 downwards. Several oil passages 53 are provided between the snap-in lugs 52 with the openings serving for guiding the oil.

The position of the oil supply passage 43 and the two oil drain passages 44 and 45 in the embodiment according to FIG. 2 is the same as compared with the embodiment according to FIG. 1. Also in this case the lube oil to be cleaned is guided through the oil supply passage 43 to the outer circumference of the filter element 2. Now a part of the oil streams through the filter element from the outside to the inside and gets into the oil drain passage 44 and further on to the lube points of the internal combustion engine. Another part of the lube oil supplied through the oil supply passage 43 passes the outer circumference of the filter element 2 upwards directly through the oil openings 53 into the inlet 33 of the centrifuge 3. After passing through the centrifuge 3 this oil passes at the outside of the bell-shaped intermediate wall 5 downwards into the second oil drain passage 45 and from there into the oil sump of the internal combustion engine.

Figure 3:
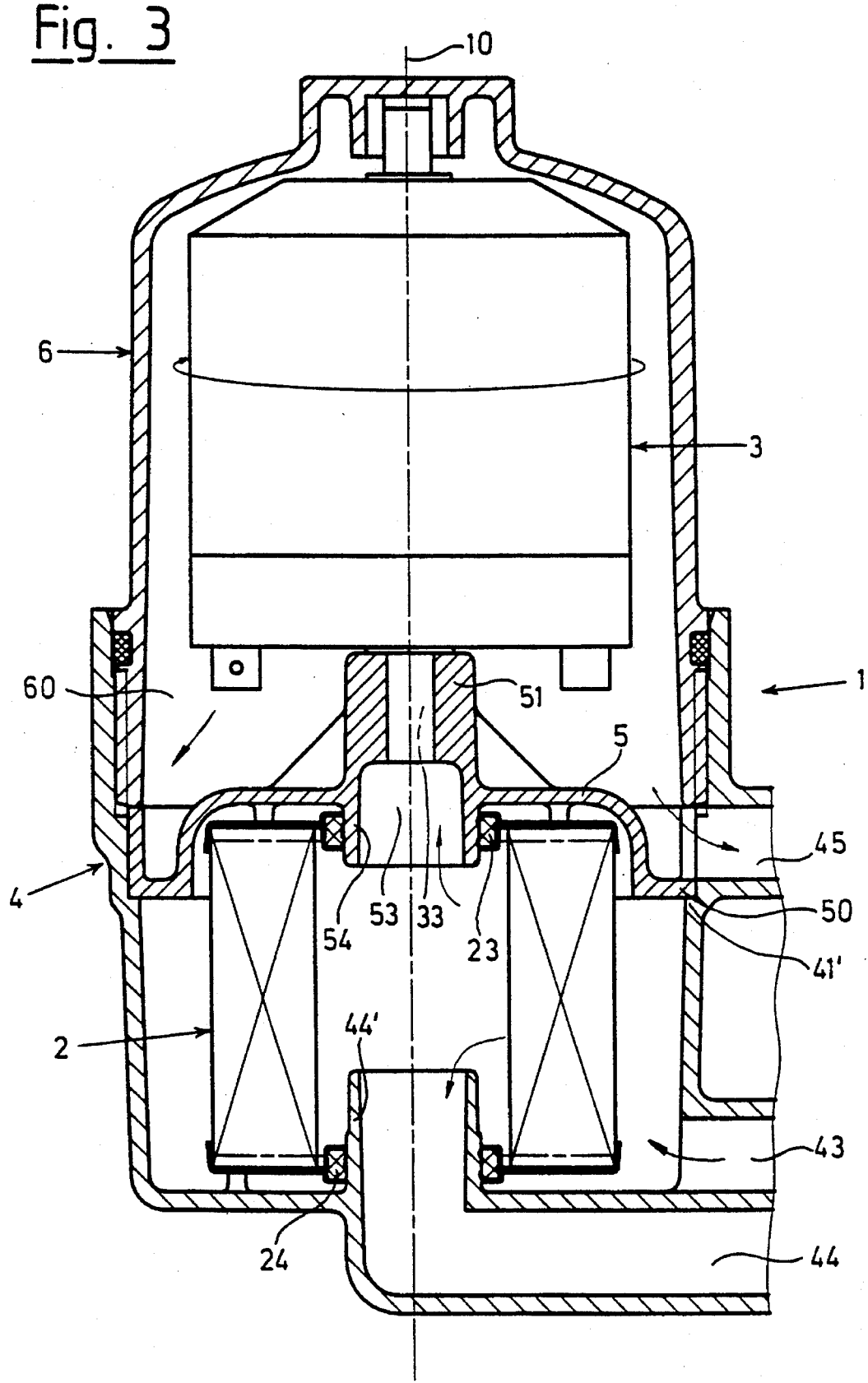
FIG. 3 is the device in the same illustration in a third embodiment.

With the embodiment of the device 1 according to FIG. 3 the supply and drain of the lube oil is attained from the side or, respectively, to the side (rather than the bottom), deviating from the two embodiments described before. Hereby the device may be adapted to different construction conditions pre-conditioned by the side of the internal combustion engine. Again the filter element 2 corresponds with the embodiment in FIG. 1 and is secured at the upper and lower side thereof by means of the upper and lower sealing ring 23, 24 at the lower pipe piece 44 and an upper connection piece 54 designed as a part of the intermediate wall 5 and protruding downwards. Furthermore in this embodiment the intermediate wall 5 again is designed bell-shaped, however, only with a small height. The intermediate wall 5 again rests with a supporting rim 50 on a step 41' at the side of the housing and is secured thereon by the cover 6 when it is screwed on.

In this case the supply of the lube oil to be cleaned is attained through the oil supply passage 43 laterally in the height of the upper and of the filter element 2. The supplied oil flows to the outer circumference of the filter member and completely flows therethrough. From the interior of the filter element 2, a part of the filtered lube oil flows through the central pipe piece 44' in the first oil drain passage 44 leading laterally to the right side. A further part of the filtered lube oil flows in a stream from the interior of the filter element 2 upwards through the oil opening 53 in the intermediate wall 5 to the inlet 33 of the centrifuge 3. This further part stream of the lube oil, after having passed through the centrifuge 3, flows into the inner chamber 60 of the cover 6 and from there to the upper side of the intermediate wall 5. The oil flows circumferentially to the second oil drain passage 45 arranged laterally at the height of the lowest part of the intermediate wall 5.

Finally, FIG. 4 of the drawing shows an embodiment of the device 1 wherein in contrast to the previously described three embodiments, the filter element 2 is arranged above the centrifuge 3 in the housing 4 of the device 1. Again the intermediate wall 5 is arranged between the filter element 2 and the centrifuge 3 with the intermediate wall having the form of a flat disc.

For supporting the centrifuge 3 in the interior 40 of the housing 4, a central bearing support 41 is provided in the lower part of the housing 4 with the lower bearing 32 of the centrifuge 3 positioned in the bearing support 41. The upper bearing 31 of the centrifuge 3 is arranged in a bearing support 51 in the intermediate wall 5 with the bearing support 51 coaxial with the central axis 10.

At the side opposing the centrifuge, which is the upper side thereof, the intermediate wall 5 is integrated with an upwards extending central pipe 55 with openings 55'. The central pipe 55 carries at the outmost upper end thereof a circumferential undercut snap-in recess 56.

The filter element 2 is positioned on the central pipe 55 with the filter element 2 designed in accordance with the embodiments according to FIGS. 1 and 3. Therein the upper sealing ring 23 and the lower sealing ring 24 are arranged sealingly at the central pipe 55. The hollow interior of the central pipe 55 forms an oil passage extending coaxially with the central axis 10 through the oil passage 53 through the centrifuge 3 downwards to the first oil drain passage 45 provided at the lower end of the housing 4 with the oil drain passage 44 guiding the lube oil filtered by the filter element 2.

With this embodiment according to FIG. 4, the oil supply passage 43 is provided in the right upper part of the housing 4 above the intermediate wall 5. The lube oil to be cleaned flows through this oil supply passage 43 into the inner chamber 60 of the cover 6 which is designed as a screw cover. The supplied lube oil to be cleaned flows through the filter element 2 from the outside to the inner side thereof and flows through the openings 55' into the interior of the central pipe 55. From there the oil flows downwards through the middle part of the centrifuge 3. A part of the downward flowing oil flows directly into the first oil drain passage 44, a further part of the stream of the filtered oil on its way through the interior of the centrifuge 3 passes into the centrifuge and is cleaned therein. The centrifuged oil flows through the jets 34, 34' into the lower part of the inner chamber 40 of the housing 4 and flows laterally to the second oil drain passage 45.

The snap-in recess 56 positioned at the upper end of the central pipe 55 with this embodiment receives several snap-in lugs 66 integral with the cover 6. When the cover 6 is unscrewed, the intermediate wall 5 with the filter element 2 positioned thereon is removed upwards out of the housing 4 by means of the snap-in connection formed by the snap-in lugs 66 and the snap-in recess 56. After having taken out this unit, the centrifuge 3 is accessible from the top. In order to replace the filter element 2, the snap-in connection between the cover 6 and the intermediate wall 5 is released, whereupon the filter element 2 is removed upwards along the central pipe 55 and is replaced by a new filter element 2.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A device for separating contaminants out of lube oil of an internal combustion engine with the device comprising a housing having an open top end and a closed bottom wall a cover for closing said open top end, an intermediate wall positioned within the housing between said open top end and said closed bottom wall for forming a filter chamber adjacent said closed bottom wall, said housing including supply passage for directing lube oil to be cleaned into said filter chamber, said housing including a first oil drain passage in said closed bottom end for directing cleaned lube oil from said filter chamber, a filter element positioned within said filter chamber, said filter element having an exterior inlet side in fluid communication with the supply passage and an interior outlet side in communication with the first drain passage, and a centrifuge positioned between said cover and said intermediate wall, said centrifuge including an inlet communicating with the supply passage and an outlet arranged to cause rotation of the centrifuge about an axis by means of the lube oil flowing through the outlet, wherein said housing includes a second oil drain passage for receiving oil from the outlet of said centrifuge, whereby the filter element and the centrifuge are arranged in said housing and with the filter element and the centrifuge removable from the housing when the cover is removed from the housing, wherein the filter element and the centrifuge are arranged in the housing coaxially about and axially spaced apart along said axis.

2. A device according to claim 1, wherein the intermediate wall comprises means for securing, supporting and centering the filter element and the centrifuge, the intermediate wall comprising a passage for directing lube oil from the outlet side of said filter element to the inlet of said centrifuge.

3. A device according to claim 2, wherein the filter element and the intermediate wall include means for forming a unit which may be attachable to and removable from the housing as a unit.

4. A device according to claim 3, wherein the unit additionally comprises the cover of the housing.

5. A device according to claim 2, wherein the centrifuge and the intermediate wall include means for forming a unit which may be attachable to and removable from the housing as a unit.

6. A device according to claim 5, wherein the unit additionally comprises the cover of the housing.

7. A device according to claim 2, wherein the filter element and the centrifuge and the intermediate wall include means for forming a unit which may be attachable to and removable from the housing as a unit.

8. A device according to claim 1, wherein the housing comprises a substantially cylindrical inner chamber with a threaded portion and the cover is a substantially cylindrically shaped cover with a threaded portion which is threadingly mated with the threaded portion of the housing.

9. A device according to claim 2, wherein the intermediate wall comprises a supporting rim having opposed upper and lower sides, wherein the lower side engages and is supported by a step at an inner said wall of the housing and the upper side is engaged by the cover when it is mounted on the housing.

10. A device according to claim 2, wherein the intermediate wall comprises an upper front end and a lower front side, wherein said lower front side engages and is supported by said bottom wall of the housing and the upper front end is engaged by the cover when the cover is mounted on the housing.

11. A device according to claim 2, wherein the intermediate wall rests with a lower front side thereof engaging said bottom wall of the housing and encompasses the filter element, wherein when the intermediate wall is removed from the housing, lube oil contained within the filter chamber can flow to the second oil drain passage.

12. A device according to claim 2, wherein at least the housing, the cover and the intermediate wall are formed of injection molded plastic material.

13. A device according to claim 2, wherein at least the housing, the cover and the intermediate wall are members manufactured of light metal.

* * * * *